United States Patent
Govindgari

(10) Patent No.: US 11,656,681 B2
(45) Date of Patent: May 23, 2023

(54) SYSTEM AND METHOD FOR DETERMINING USER INTERACTIONS WITH VISUAL CONTENT PRESENTED IN A MIXED REALITY ENVIRONMENT

(71) Applicant: HYPE AR, Inc., San Jose, CA (US)

(72) Inventor: Spandana Govindgari, East Windsor Township, NJ (US)

(73) Assignee: HYPEAR, INC., San Jose, CA (US)

( * ) Notice: Subject to any disclaimer, the term of this patent is extended or adjusted under 35 U.S.C. 154(b) by 0 days.

(21) Appl. No.: 17/007,429

(22) Filed: Aug. 31, 2020

(65) Prior Publication Data
US 2022/0066550 A1    Mar. 3, 2022

(51) Int. Cl.
| | |
|---|---|
| G06F 3/01 | (2006.01) |
| G06Q 30/02 | (2012.01) |
| G06V 40/20 | (2022.01) |
| G06V 40/16 | (2022.01) |
| G06Q 30/0241 | (2023.01) |
| G06Q 30/0251 | (2023.01) |

(52) U.S. Cl.
CPC .............. *G06F 3/013* (2013.01); *G06F 3/017* (2013.01); *G06Q 30/0267* (2013.01); *G06Q 30/0277* (2013.01); *G06V 40/174* (2022.01); *G06V 40/20* (2022.01)

(58) Field of Classification Search
CPC ..... G06F 3/013; G06F 3/017; G06K 9/00302; G06K 9/00335; G06K 9/6217; G06Q 30/0267; G06Q 30/0277; G06T 19/006; G06V 40/174; G06V 40/20; G06V 10/82; G06V 40/171; G06V 20/50
See application file for complete search history.

(56) References Cited

U.S. PATENT DOCUMENTS

| | | | |
|---|---|---|---|
| 8,711,176 B2 * | 4/2014 | Douris | G09G 3/003 345/8 |
| 9,439,563 B2 | 9/2016 | Teller | |
| 9,600,715 B2 | 3/2017 | Natan et al. | |
| 10,008,037 B1 * | 6/2018 | Worley, III | G06T 7/00 |
| 10,298,640 B1 * | 5/2019 | Luke | H04L 67/62 |

(Continued)

OTHER PUBLICATIONS

Abdul-Mageed, Muhammad, and Lyle Ungar. 2017. "Emonet: Fine-Grained Emotion Detection with Gated Recurrent Neural Networks." In Proceedings of the 55th Annual Meeting of the Association for Computational Linguistics (vol. 1: Long Papers), 718-28. aclweb.org.

(Continued)

*Primary Examiner* — Motilewa Good-Johnson
(74) *Attorney, Agent, or Firm* — Moore & Van Allen PLLC; W. Kevin Ransom

(57) ABSTRACT

Embodiments of the present invention provide a system for generating and displaying tailored advertisements in a mixed reality environment. The system is configured for continuously identifying one or more objects in a mixed reality environment, identifying the one or more objects match advertising targets, generating a tailored advertisement, transmitting the tailored advertisement to the user device, causing the user device to display the tailored advertisement, determining that the user is interacting with the tailored advertisement, and capturing one or more metrics associated with the interaction of the user with the tailored advertisement.

17 Claims, 13 Drawing Sheets

(56) References Cited

U.S. PATENT DOCUMENTS

| | | | |
|---|---|---|---|
| 10,318,983 B2 | 6/2019 | Wu et al. | |
| 2008/0147488 A1* | 6/2008 | Tunick | G06Q 30/0273 |
| | | | 382/209 |
| 2010/0205035 A1* | 8/2010 | Baszucki | G06Q 20/102 |
| | | | 705/40 |
| 2013/0054576 A1* | 2/2013 | Karmarkar | G06F 16/95 |
| | | | 707/E17.014 |
| 2013/0151333 A1* | 6/2013 | el Kaliouby | G06Q 30/0242 |
| | | | 705/14.45 |
| 2014/0063054 A1* | 3/2014 | Osterhout | G06F 3/005 |
| | | | 345/633 |
| 2014/0098136 A1* | 4/2014 | Fein | G06T 11/00 |
| | | | 345/633 |
| 2014/0253589 A1* | 9/2014 | Tout | G06K 19/06046 |
| | | | 345/633 |
| 2015/0113454 A1* | 4/2015 | McLaughlin | G06F 3/013 |
| | | | 715/765 |
| 2015/0235267 A1* | 8/2015 | Steube | G06V 20/20 |
| | | | 705/14.58 |
| 2015/0301592 A1* | 10/2015 | Miller | G06F 3/012 |
| | | | 345/156 |
| 2015/0310657 A1* | 10/2015 | Eden | G06F 3/04815 |
| | | | 345/441 |
| 2016/0092914 A1* | 3/2016 | Wiener | G06Q 30/0277 |
| | | | 705/14.45 |
| 2016/0217623 A1* | 7/2016 | Singh | G09G 3/003 |
| 2017/0103440 A1* | 4/2017 | Xing | H04W 12/06 |
| 2017/0115742 A1* | 4/2017 | Xing | G06F 3/0485 |
| 2017/0293356 A1* | 10/2017 | Khaderi | G06F 3/147 |
| 2018/0095616 A1* | 4/2018 | Valdivia | G06F 3/013 |
| 2018/0288477 A1* | 10/2018 | Gupta | H04N 21/4532 |
| 2018/0323972 A1* | 11/2018 | Reed | G06F 3/013 |
| 2018/0330404 A1* | 11/2018 | Bennett | G06Q 30/0261 |
| 2018/0330408 A1* | 11/2018 | Bennett | G06F 16/951 |
| 2018/0349703 A1* | 12/2018 | Rathod | G06Q 20/3276 |
| 2018/0349946 A1* | 12/2018 | Nguyen | G06Q 30/0244 |
| 2019/0102922 A1* | 4/2019 | Gum | G01C 21/206 |
| 2019/0108578 A1* | 4/2019 | Spivack | G09G 5/14 |
| 2019/0114528 A1 | 4/2019 | Xiong et al. | |
| 2020/0021886 A1* | 1/2020 | Kawk | H04N 21/4668 |
| 2020/0057486 A1* | 2/2020 | Sugihara | G06F 3/165 |
| 2020/0249752 A1* | 8/2020 | Parshionikar | G06F 1/163 |
| 2021/0081985 A1* | 3/2021 | Xu | G06Q 30/0242 |
| 2021/0286504 A1* | 9/2021 | Moore | H04N 21/482 |
| 2021/0326594 A1* | 10/2021 | Costello | G06V 20/35 |
| 2022/0142535 A1* | 5/2022 | Burstein | A61B 5/441 |

OTHER PUBLICATIONS

Howard, Andrew G., Menglong Zhu, Bo Chen, Dmitry Kalenichenko, Weijun Wang, Tobias Weyand, Marco Andreetto, and Hartwig Adam. 2017. "MobileNets: Efficient Convolutional Neural Networks for Mobile Vision Applications." arXiv [cs.CV]. arXiv. http://arxiv.org/abs/1704.04861.

Saha, Suman, Gurkirt Singh, Michael Sapienza, Philip H. S. Torr, and Fabio Cuzzolin. 2016. "Deep Learning for Detecting Multiple Space—Time Action Tubes in Videos." arXiv [cs.CV]. arXiv. http://arxiv.org/abs/1608.01529.

Szegedy, Christian, Wei Liu, Yangqing Jia, Pierre Sermanet, Scott Reed, Dragomir Anguelov, Dumitru Erhan, Vincent Vanhoucke, and Andrew Rabinovich. 2015. "Going Deeper with Convolutions." In Proceedings of the IEEE Conference on Computer Vision and Pattern Recognition , 1-9. cv-foundation.org.

Yeung, Serena, Olga Russakovsky, Greg Mori, and Li Fei-Fei. 2016. "End-to-End Learning of Action Detection from Frame Glimpses in Videos." In Proceedings of the IEEE Conference on Computer Vision and Pattern Recognition , 2678-87. cv-foundation.org.

Lynley,Matthew. Tech Crunch ARAD video, Sep. 17, 2017 https://techcrunch.com/video/arad/.

\* cited by examiner

SYSTEM AND METHOD FOR DETERMINING USER INTERACTIONS WITH VISUAL CONTENT PRESENTED IN A MIXED REALITY ENVIRONMENT

FIELD OF THE INVENTION

The present invention relates to mixed reality environments and, more specifically, to generating and displaying tailored advertisements in mixed reality environments.

BACKGROUND

Existing conventional systems typically focus on effectively delivering advertisements in websites, social media platforms, or the like. However, with increase in technology associated with mixed reality, the existing methods of delivering and converting advertisements cannot be applied to mixed reality environments. As such, there exists a need for a system to generate and display advertisements in mixed reality environments.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for generating and displaying advertisements in a mixed reality environment. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention displays visual content associated with an advertisement in a mixed reality environment of a user, via a user device of the user, in response to displaying the visual content, perform at least one of one or more actions of continuously monitoring gaze of the user via the user device, continuously monitoring one or more gestures of the user, via the user device, and continuously monitoring one or more expressions of the user, via the user device, determine that the user is interacting with the visual content based on at least one of the gaze, the one or more gestures, and the one or more expressions of the user.

In some embodiments, the present invention generates and displays additional visual content in response to determining that the user is interacting with the visual content.

In some embodiments, the present invention performs at least one of the one or more actions based on determining type of the mixed reality environment of the user and determining type of the visual content.

In some embodiments, the type of visual content is at least a two dimensional advertisement or a three dimensional advertisement, wherein the two dimensional advertisement comprises a two dimensional image or a two dimensional video, wherein the three dimensional advertisement comprises at least one of a three dimensional animation, a three dimensional image, a three dimensional video.

In some embodiments, the type of the mixed reality environment is a virtual reality environment. In some embodiments, the present invention the type of the mixed reality environment is an augmented reality environment.

In some embodiments, the present invention determines that the user is interacting with the visual content based on matching the at least one of the gaze, the one or more gestures, and the one or more expressions of the user with one or more interactions gestures associated with the visual content.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
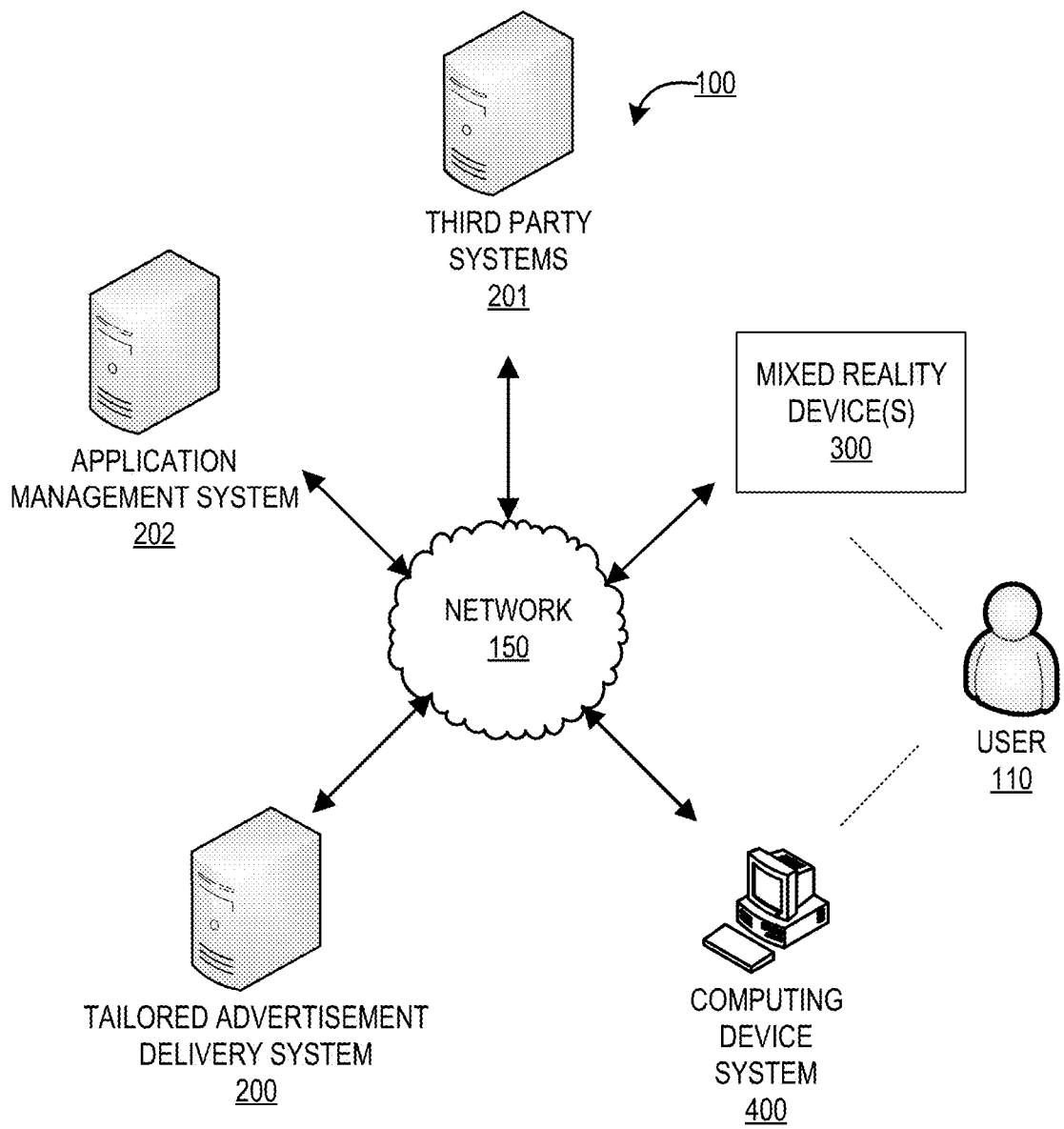
Figure 2:
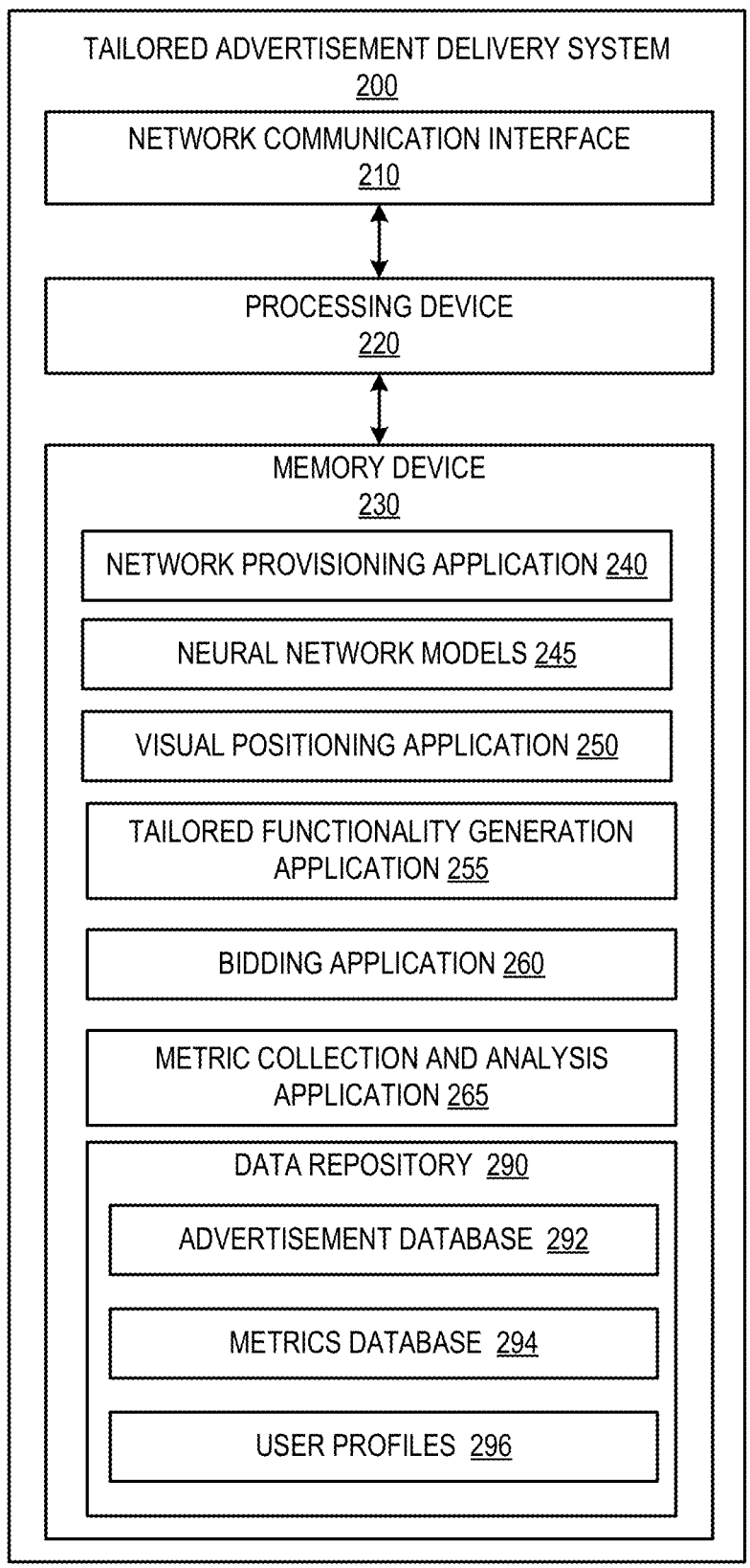
Figure 3:
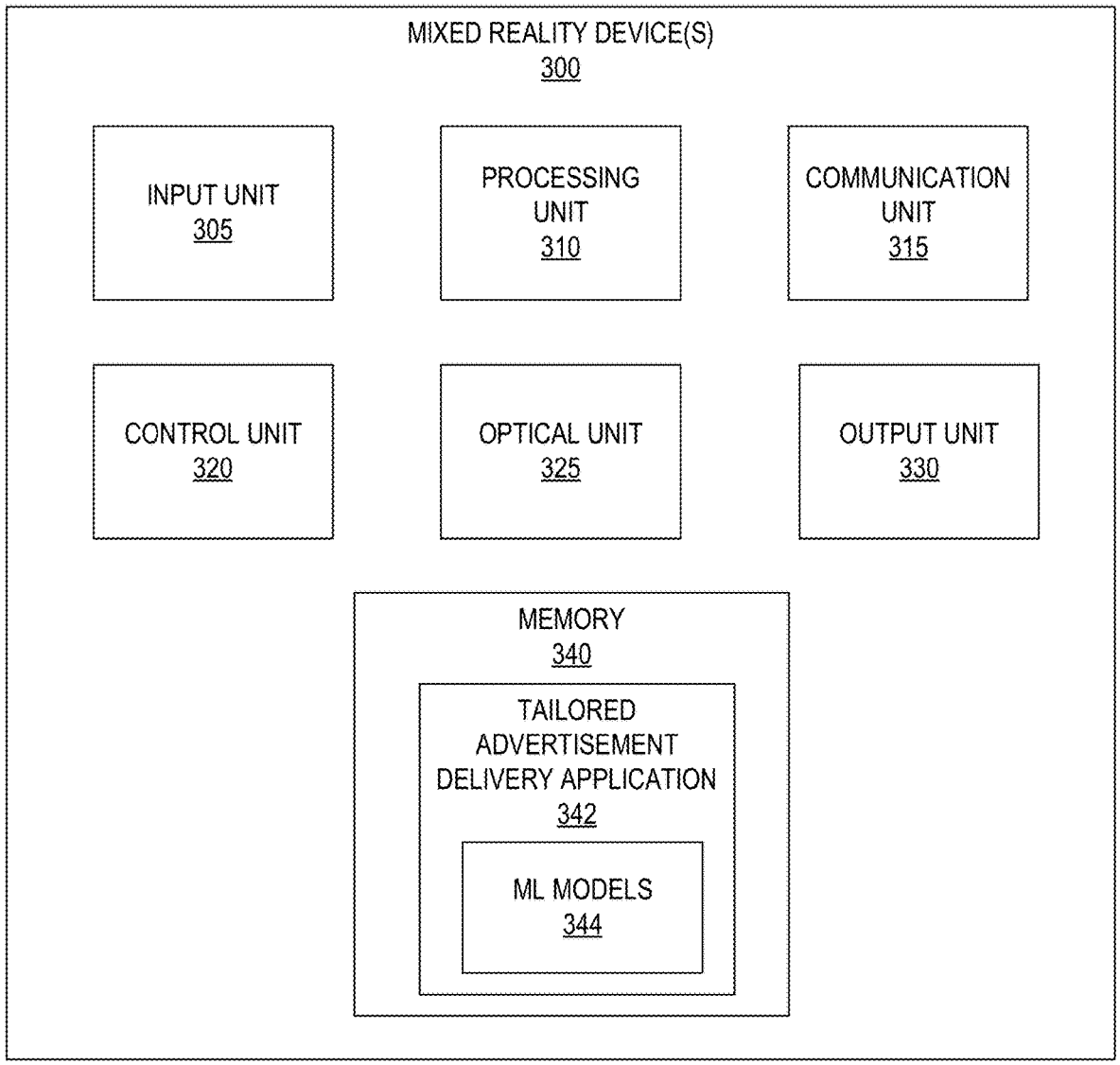
Figure 4:
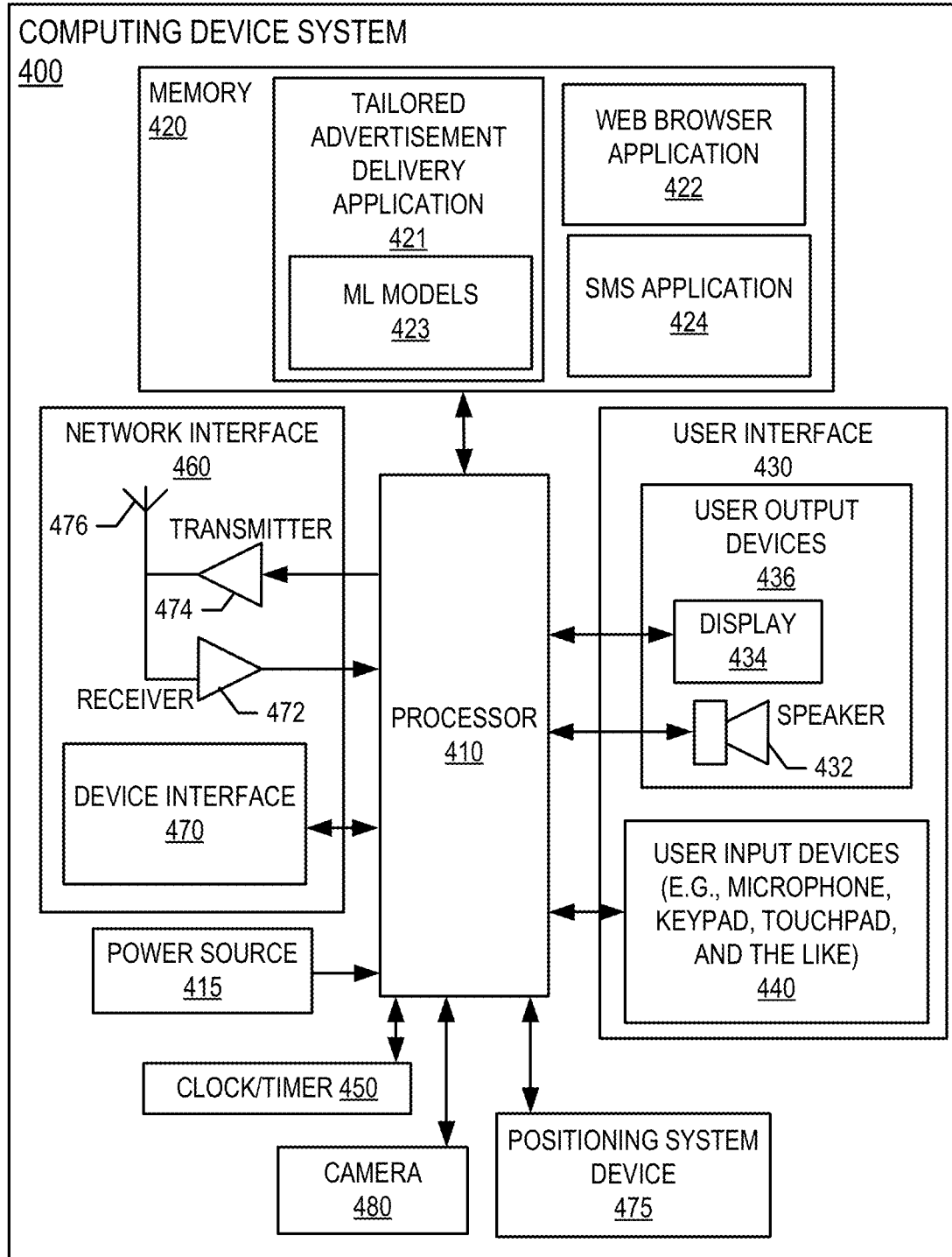
Figure 5:
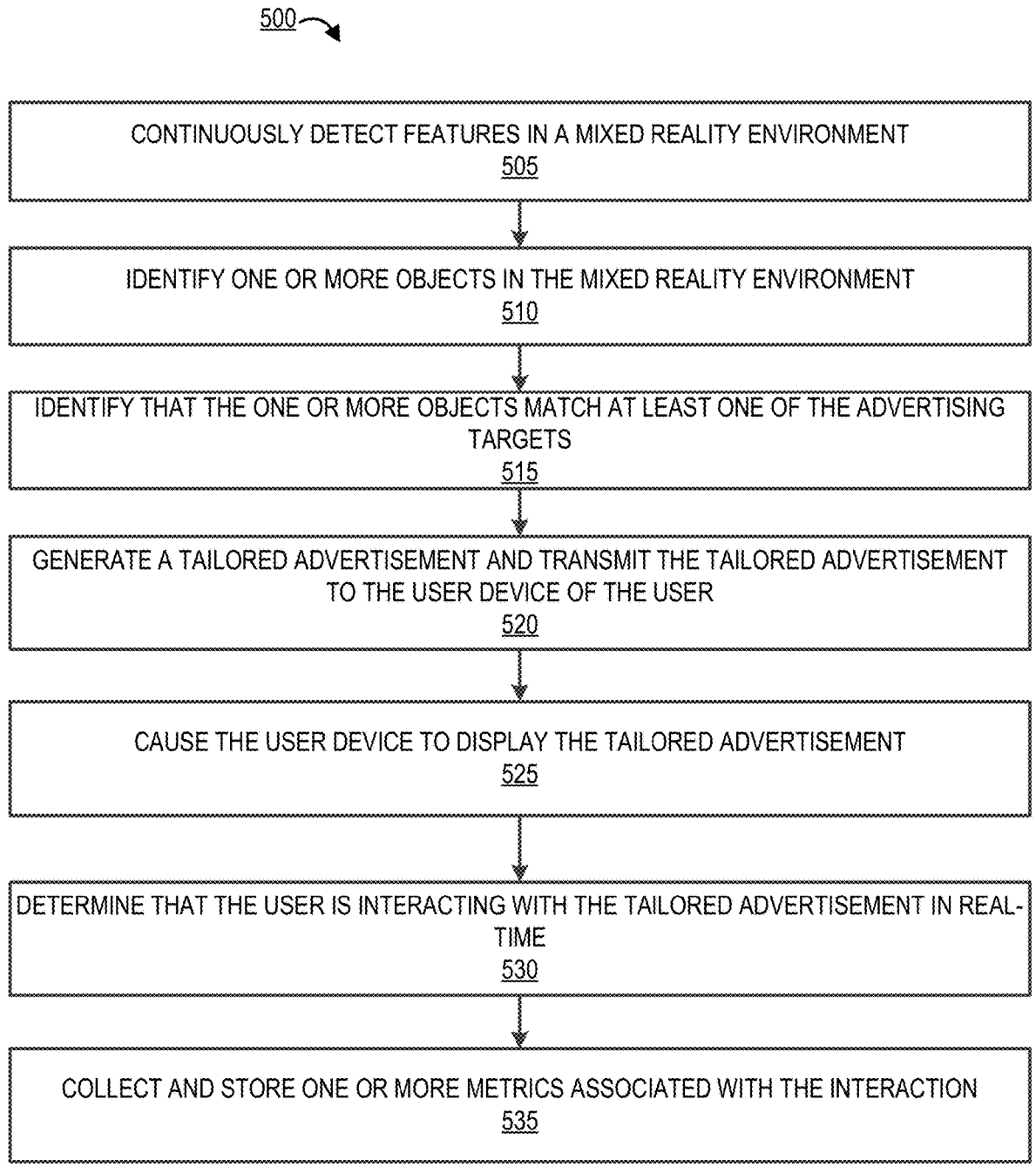
Figure 6:
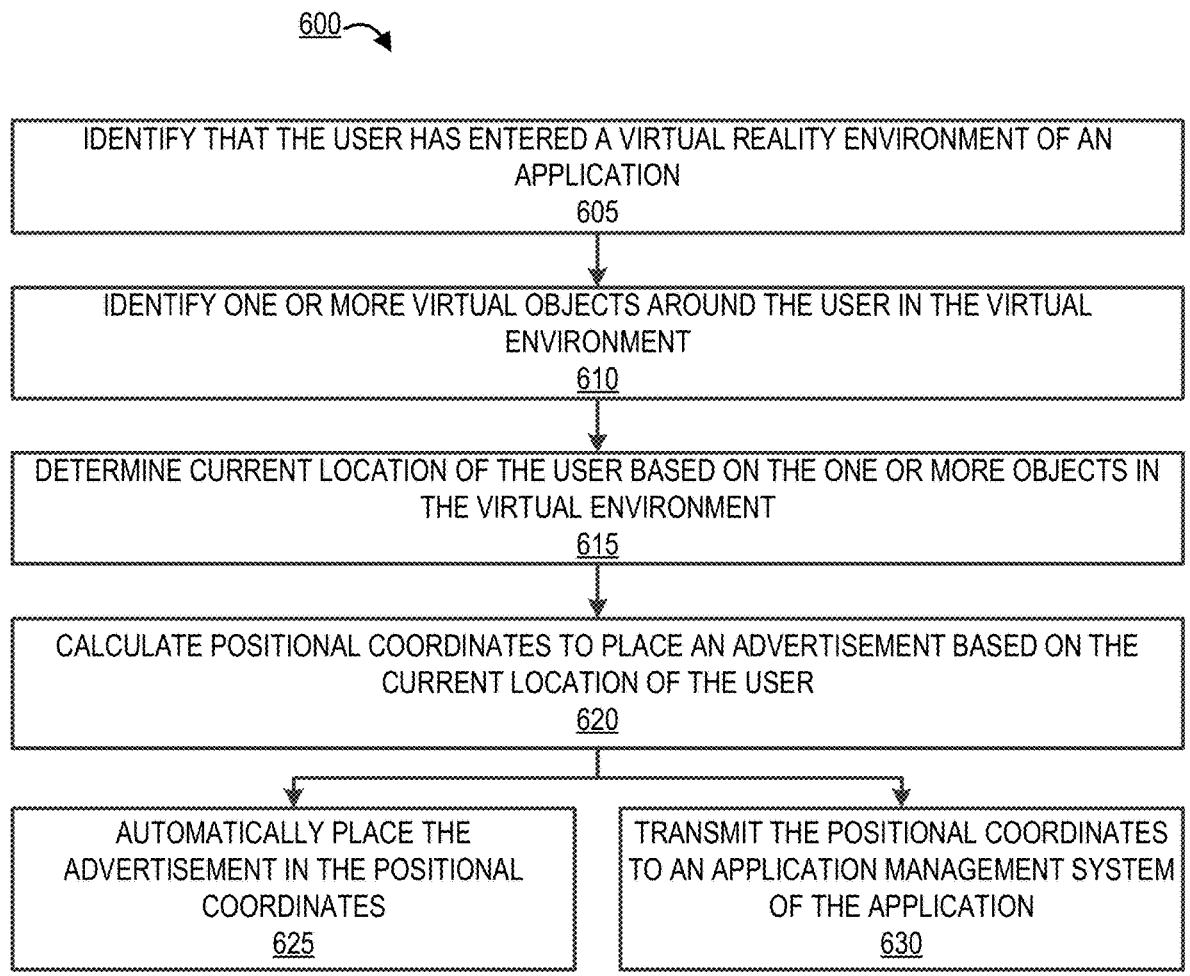
Figure 7:
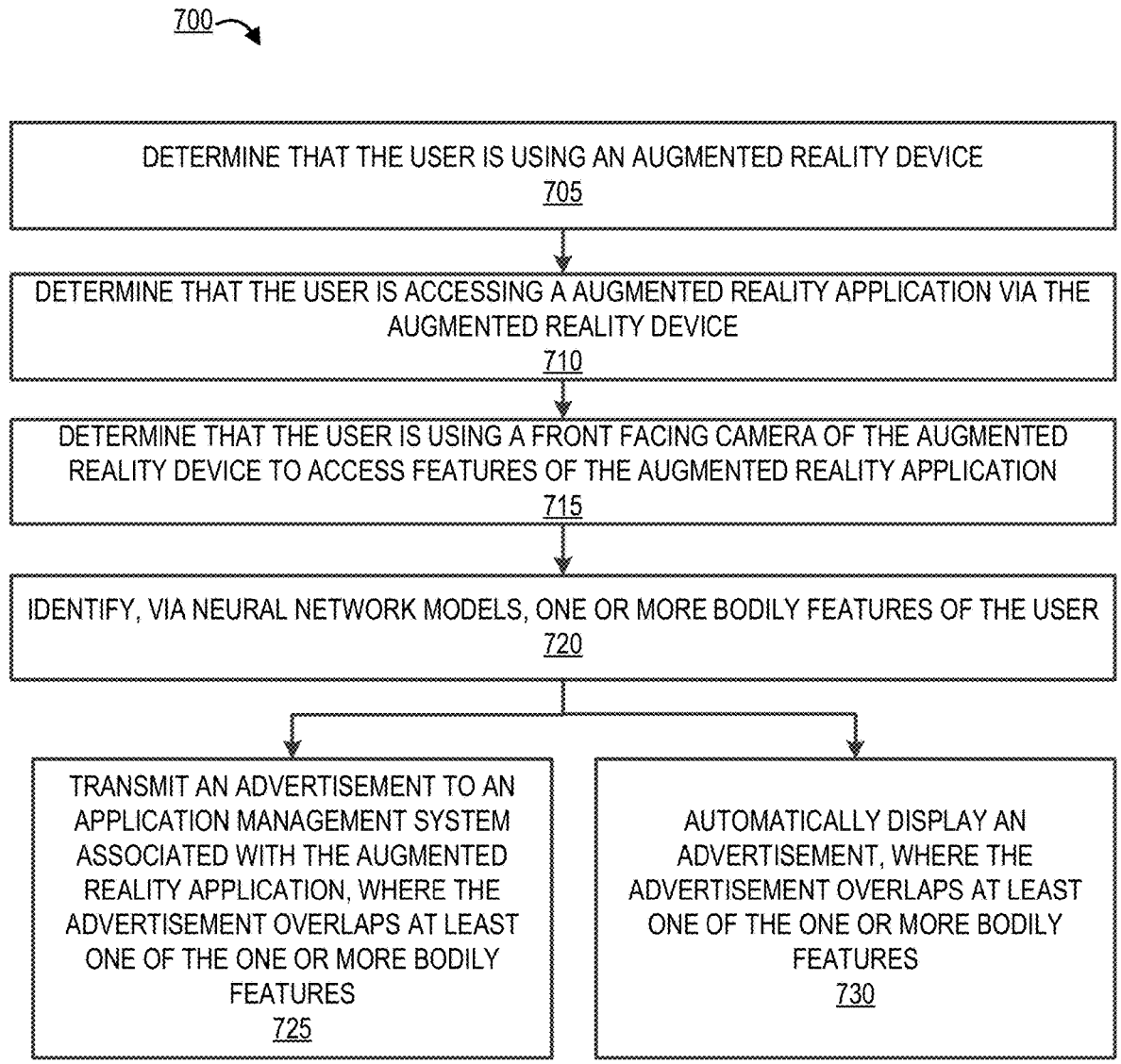
Figure 8:
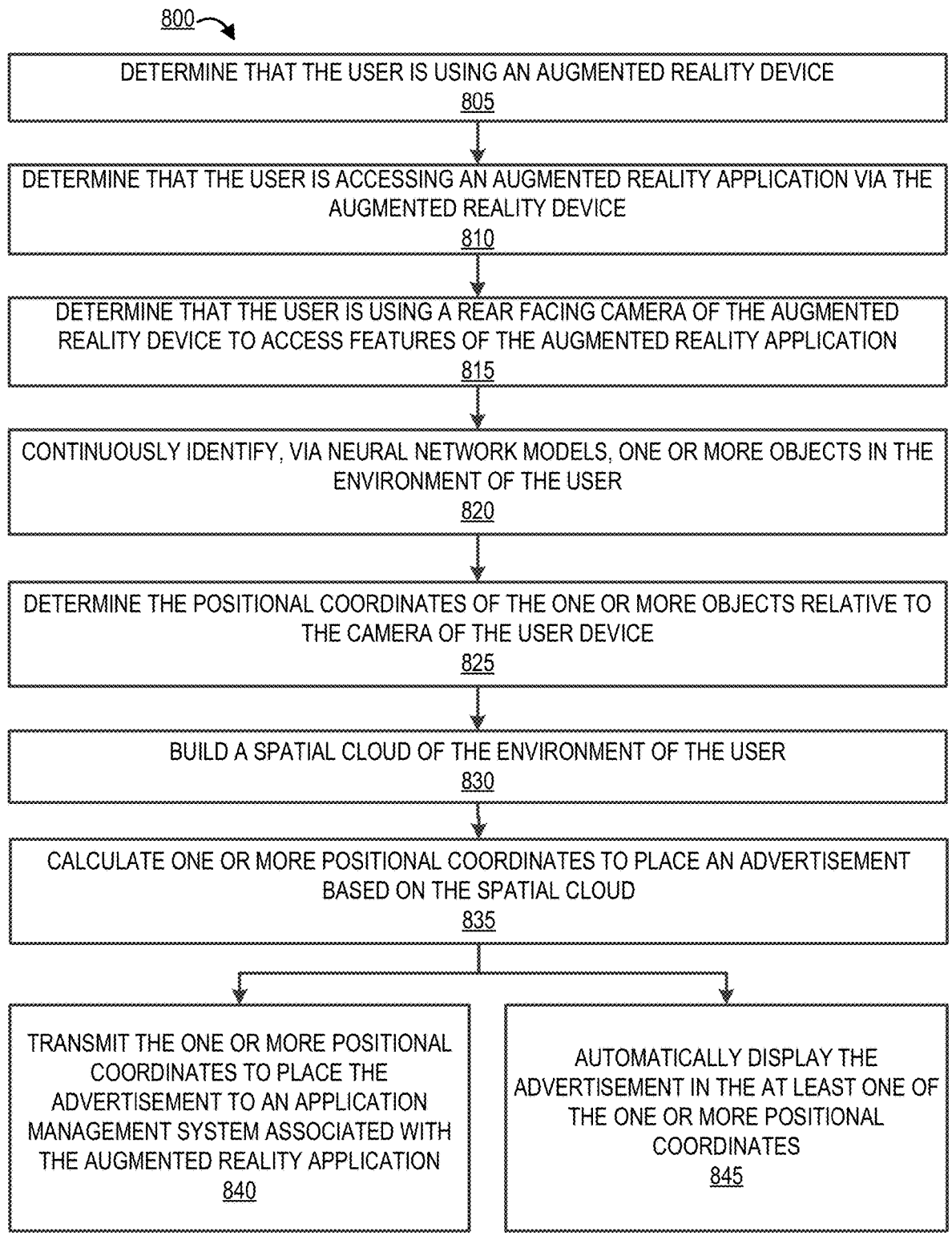
Figure 9:
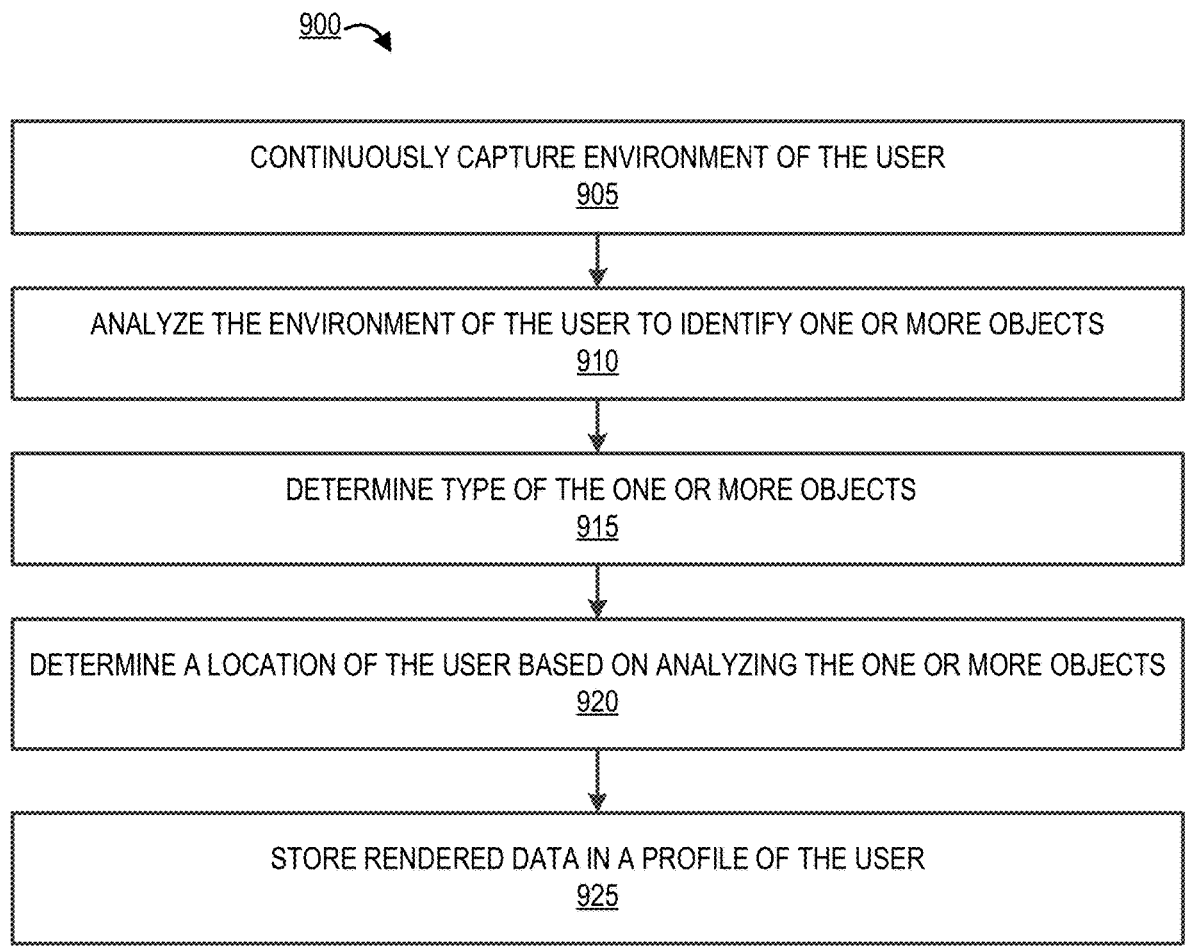
Figure 10:
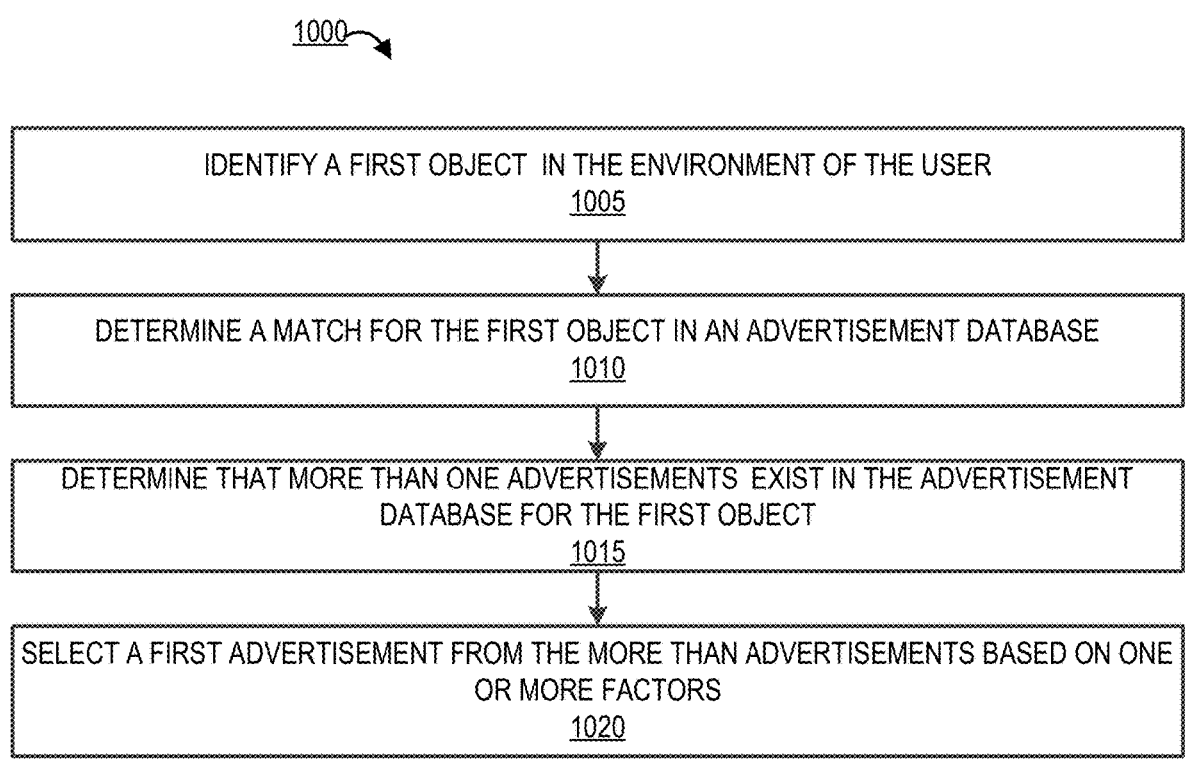
Figure 11:
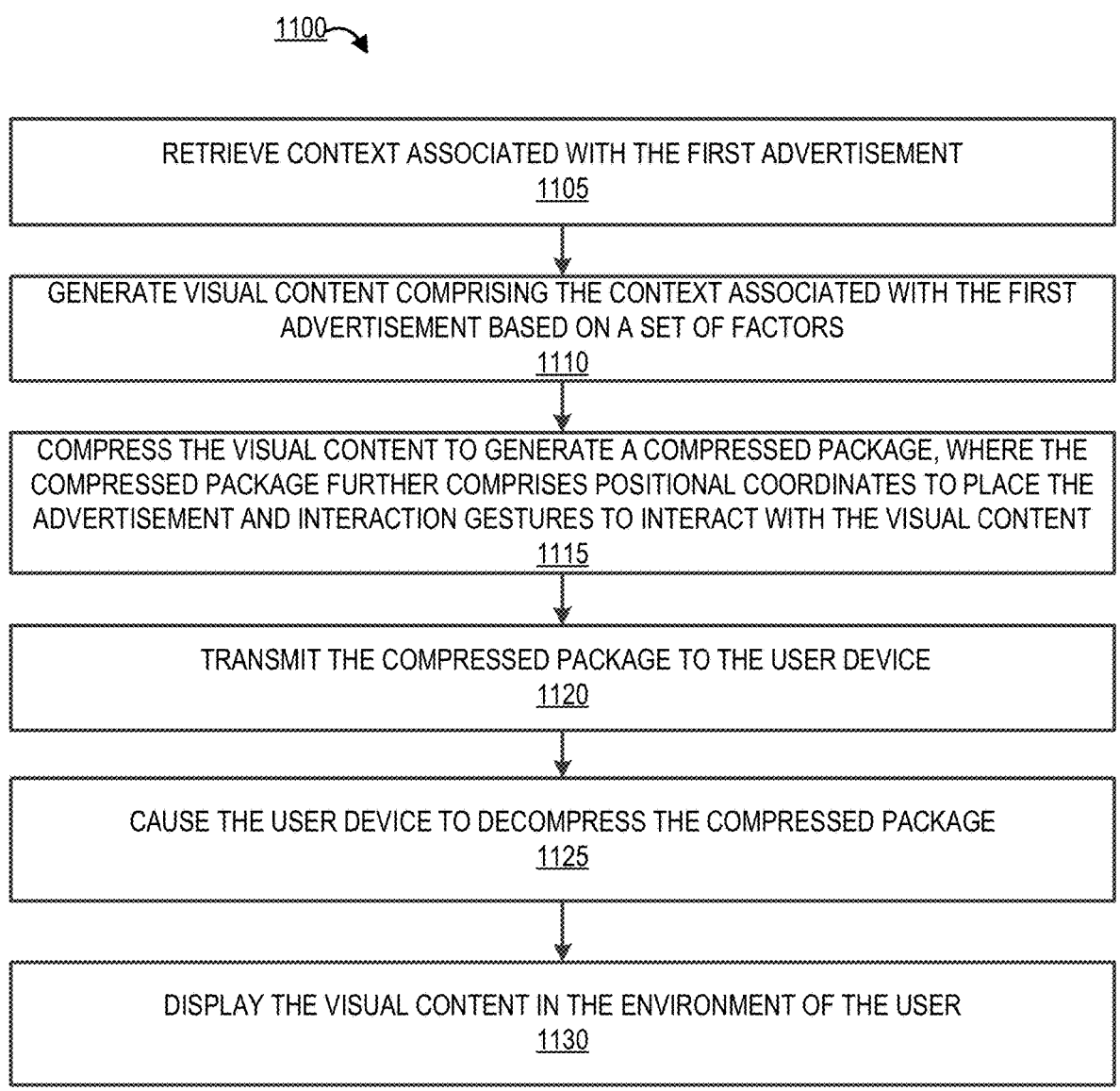
Figure 12:
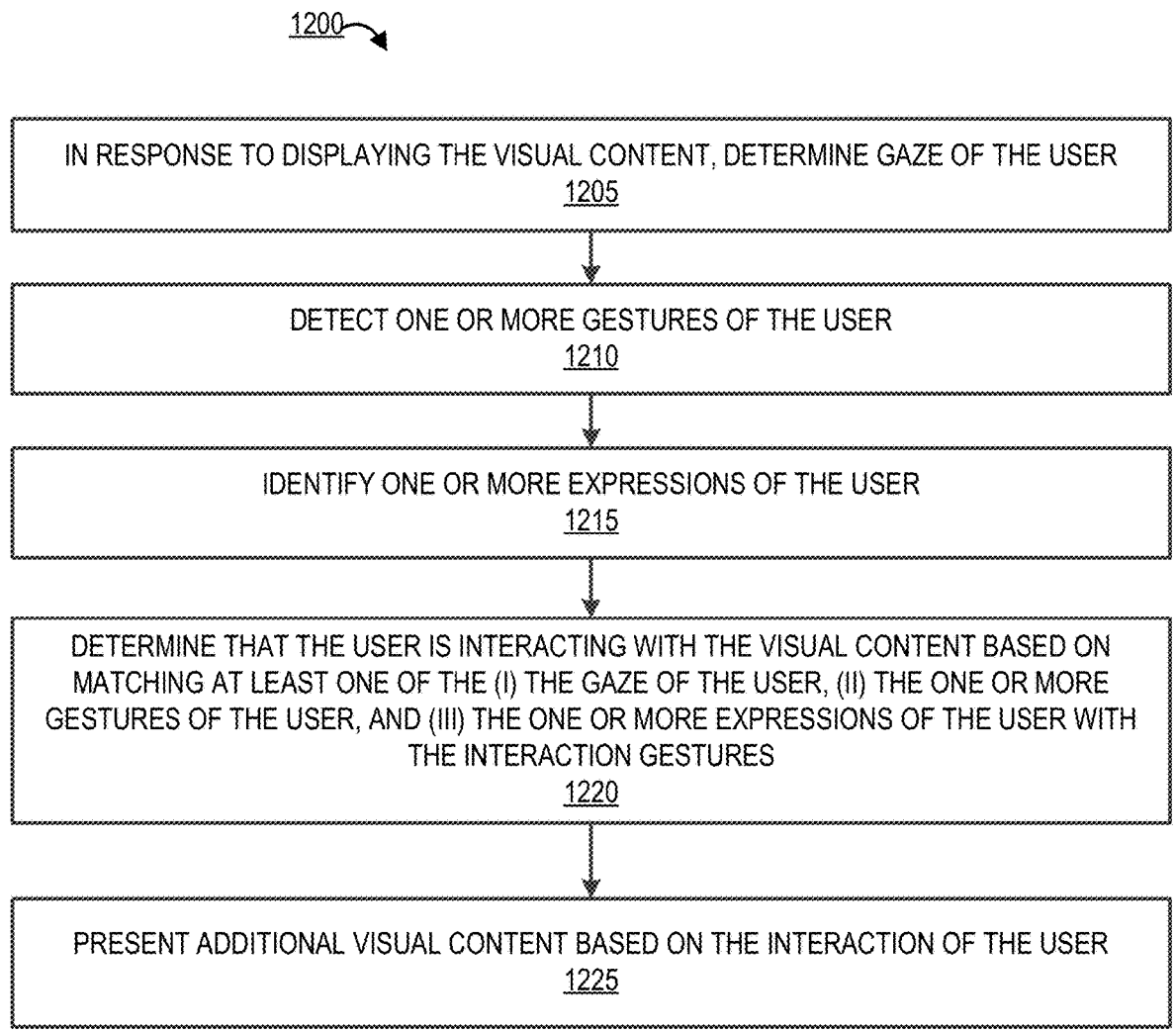
Figure 13:
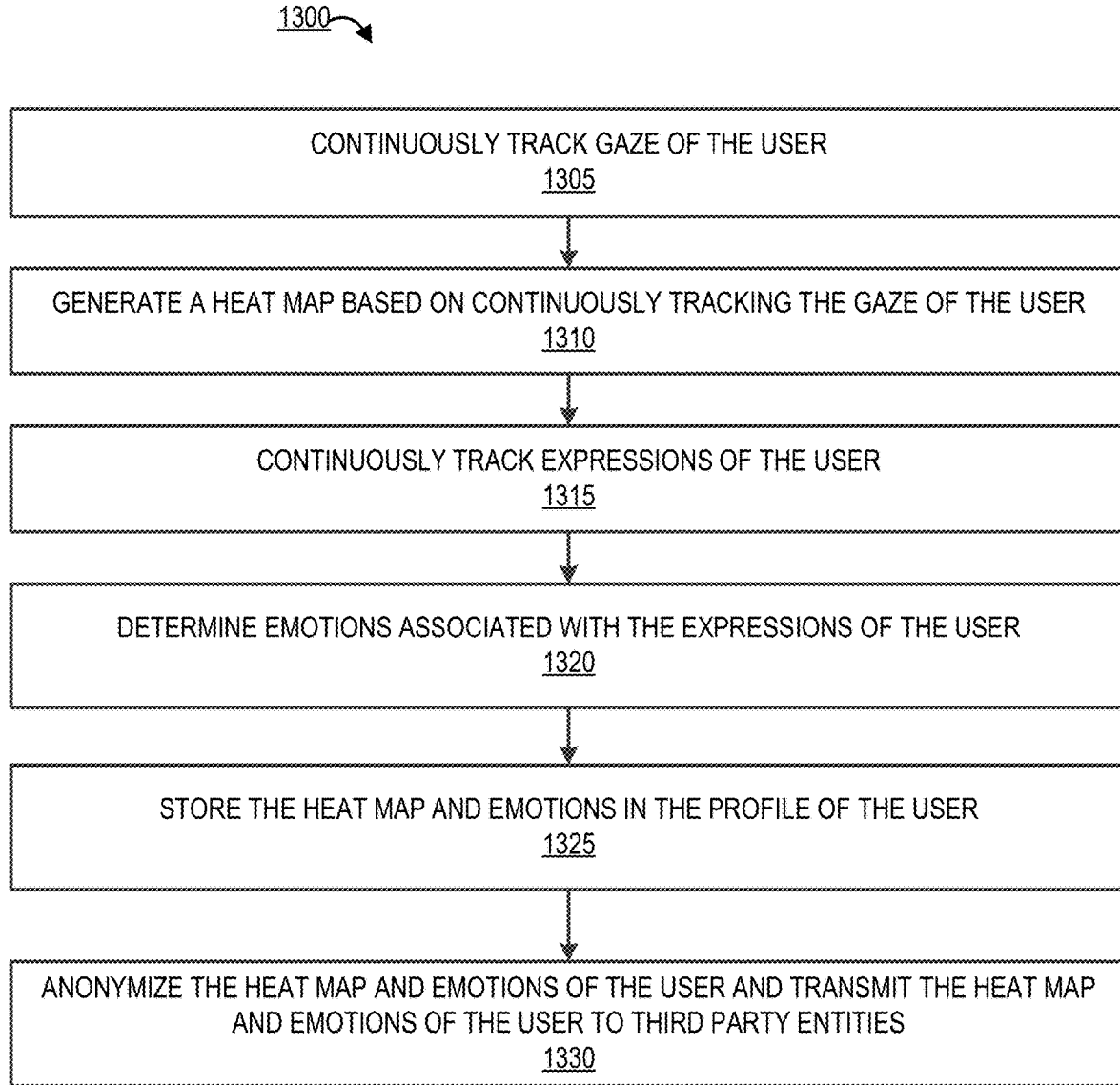

Having thus described embodiments of the invention in general terms, reference will now be made the accompanying drawings, wherein:

FIG. 1 provides a block diagram illustrating a system environment for delivering advertisements in a mixed reality environment, in accordance with an embodiment of the invention;

FIG. 2 provides a block diagram illustrating the tailored advertisement delivery system 200 of FIG. 1, in accordance with an embodiment of the invention;

FIG. 3 provides a block diagram illustrating a mixed reality device(s) 300 of FIG. 1, in accordance with an embodiment of the invention;

FIG. 4 provides a block diagram illustrating the computing device system 400 of FIG. 1, in accordance with an embodiment of the invention;

FIG. 5 provides a flowchart illustrating a process flow for delivering tailored advertisements in a mixed reality environment, in accordance with an embodiment of the invention;

FIG. 6 provides a flowchart illustrating a process flow for delivering tailored advertisements in a virtual reality environment, in accordance with an embodiment of the invention;

FIG. 7 provides a flowchart illustrating a process flow for delivering tailored advertisements in an augmented reality environment when the user is using a front faced camera of an augmented reality device, in accordance with an embodiment of the invention;

FIG. 8 provides a flowchart illustrating a process flow for delivering tailored advertisements in an augmented reality environment when the user is using a rear faced camera of an augmented reality device, in accordance with an embodiment of the invention;

FIG. 9 provides a flowchart illustrating a process flow for analyzing features in a mixed reality environment and identifying one or more objects in the mixed reality environment, in accordance with an embodiment of the invention;

FIG. 10 provides a flowchart illustrating a process flow for determining a match between objects in the mixed reality environment of the user and one or more advertisements stored in an advertisement database, in accordance with an embodiment of the invention;

FIG. 11 provides a flowchart illustrating a process flow for retrieving and displaying advertisements in the mixed reality environment of the user, in accordance with an embodiment of the invention;

FIG. 12 provides a flowchart illustrating a process flow for determining interaction between the user and the advertisement presented in the mixed reality environment of the user, in accordance with an embodiment of the invention; and FIG. 13 provides a flowchart illustrating a process flow for collecting and storing interaction metrics associated with the interaction of the user with the advertisement, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

FIG. 1 provides a block diagram illustrating a system environment for delivering advertisements in a mixed reality environment, in accordance with an embodiment of the invention. As illustrated in FIG. 1, the environment 100 includes a tailored advertisement delivery system 200, one or more third party systems 201, an application management system 202, user devices of one or more users 110 comprising mixed reality device(s) 300 and a computing device system 400.

The tailored advertisement delivery system 200 is a system of the present invention for performing one or more process steps described herein. In some embodiments, the tailored advertisement delivery system is a cloud computing system. In some embodiments, the tailored advertisement delivery system is a non-cloud computing system. The one or more third party systems 201 may be any systems of a third party entity (e.g., an advertiser) that bids on one or more objects to promote their products or services via advertisements provided by the system of the present invention.

The application management system 202 may be any system that provides, maintains, and/or manages one or more applications utilized by the users 110, where the applications may be mixed reality applications. In some embodiments, the users 110 may download and store the applications provided by the application management system 202 on the mixed reality device(s) 300 and/or the computing device system 400. In some embodiments, the applications provided by the application management system 202 may be virtual reality applications. In some other embodiments, the applications provided by the application management system 202 may be augmented reality applications. In some embodiments, the application management system 202 may be operated and/or controlled by an application developer who developed the one or more applications utilized by the users 110.

The third party entity and an entity that provides the one or more applications to the users 110 may be clients of the entity that owns the system of the present invention, where the advertisements of products and/or services provided by the third party entity are displayed in the one or more applications provided by the application management system 202. In some embodiments, the advertisements may be displayed in an independent platform that is not an application provided by the application management system 202.

Users 110 may use mixed reality devices(s) 300 and the computing device system 400 to access mixed reality environments. The mixed reality device(s) 300 may be any device that allows users to experience a mixed reality environment. Mixed reality environment comprises virtual elements (e.g., computer graphics) and/or real-world elements, where a user can interact with the virtual elements and manipulate the virtual elements. In some embodiments, the mixed reality environment may be a virtual reality environment. An environment that exclusively comprises virtual elements with no real-world elements is referred to as a virtual reality environment in the present invention. In some embodiments, the mixed reality environment may be an augmented reality environment. An environment where virtual elements overlay on top of the real-world elements is referred to as an augmented reality environment in the present invention.

Mixed reality device(s) 300 may include, but are not limited to, augmented reality headsets, augmented reality lens, augmented reality mirrors, virtual reality headsets, virtual reality lens, or the like. The computer device system 400 may be any device with a camera that is capable of getting information associated with real-world. In some embodiments, the computing device system 400 may be a mobile phone. In some embodiments, the computing device system 400 may be a tablet. In some embodiments, the computing device system 400 is a portable system. In some embodiments, the computing device system 400 is not a portable system.

The tailored advertisement delivery system 200, the third party entity system 201, the application management system 202, the mixed reality device(s) 300 and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the tailored advertisement delivery system 200 is configured to communicate information or instructions with the third party entity system 201, the application management system 202, the mixed reality device(s) 300, and the computing device system 400 across the network 150.

FIG. 2 provides a block diagram illustrating the tailored advertisement delivery system 200 in greater detail, in accordance with embodiments of the invention. As illustrated in FIG. 2, in one embodiment of the invention, the tailored advertisement delivery system 200 includes one or more processing devices 220 operatively coupled to a network communication interface 210 and a memory device 230.

It should be understood that the memory device 230 may include one or more databases or other data structures/repositories. The memory device 230 also includes computer-executable program code that instructs the processing device 220 to operate the network communication interface 210 to perform certain communication functions of the tailored advertisement delivery system 200 described herein. For example, in one embodiment of the tailored advertisement delivery system 200, the memory device 230 includes, but is not limited to, a network provisioning application 240, neural network models 245, a visual positioning application 250, a tailored functionality generation application 255, a bidding application 260, a metric collection and an analysis application 265, and a data repository 290 comprising an advertisement database 292, a metrics database 294, user profiles 296, and any other data received, processed, or accessed by one or more applications in the memory device 230. The computer-executable program code of the network provisioning application 240, the neural network models 245, the visual positioning application 250, the tailored functionality generation application 255, the bidding application 260, and the metric collection and analysis application 265 may instruct the processing device 220 to perform certain logic, data-processing, and data-storing functions of the tailored advertisement delivery system 200 described herein, as well as communication functions of the tailored advertisement delivery system 200.

The network provisioning application 240, the neural network models 245, the visual positioning application 250, the tailored functionality generation application 255, the bidding application 260, and the metric collection and analysis application 265 are configured to invoke or use the data in the data repository 290 when communicating through the network communication interface 210 with the tailored advertisement delivery system 200, and/or the computing device system 400. In some embodiments, the network provisioning application 240, the neural network models 245, the visual positioning application 250, the tailored functionality generation application 255, the bidding application 260, and/or the metric collection and analysis application 265 may store the data extracted or received from the mixed reality devices 300 and the computing device system 400 in the data repository 290.

In some embodiments, the network provisioning application 240, the neural network models 245, the visual positioning application 250, the tailored functionality generation application 255, the bidding application 260, and the metric collection and analysis application 265 may be a part of a single application of the tailored advertisement delivery system 200 that perform steps of the process flows described herein. The neural network models 245 may identify one or more features or objects in a real-world of the user 110 and may also identify real-time emotions of the user 110. The tailored advertisement delivery system 200 trains the neural network models 245 to identify real-world objects and features and also to identify real-time time emotions of the user 110. The visual positioning application 250 may create a spatial cloud of the user 110 that comprises one or more objects in an environment of the user 110 and coordinates of the one or more objects with respect to the position of the user 110 or position of the camera of the user device. The tailored functionality generation application 255 may generate tailored advertisements to display to the user 110. The tailored functionality generation application 255 may also calculate positional coordinates to place the generated advertisement in a mixed reality environment of the user 110. The bidding application 260 is a platform provided by the tailored advertisement delivery system 200 that comprises a user interface which allows the third party entity systems to bid on one or objects (e.g., water bottle, or the like). The metric collection and analysis application 265 may collect metrics associated with interactions of the user 110 with the advertisements displayed to the user 110 in a mixed reality environment. The metric collection and analysis application may also analyze the metrics to determine likes and dislikes of the user 110. The network provisioning application 240, the neural network models 245, the visual positioning application 250, the tailored functionality generation application 255, the bidding application 260, and the metric collection and analysis application 265 may perform additional steps of the process flow as described in FIG. 5 through FIG. 13.

FIG. 3 provides a block diagram illustrating a mixed reality device(s) 300 of FIG. 1, in accordance with an embodiment of the invention. As illustrated in FIG. 3, in one embodiment of the invention, the mixed reality device 300 includes a processing unit 310 operatively coupled with network communication unit 315, a memory 340, a control unit 320, an input unit 305, an optical unit 325, and an output unit 330. The control unit 320 may control the input unit 305, the optical unit 325, and/or the output unit 330 of the mixed reality device 300 based on the instructions received from the processing unit 310. The input unit 305 may be a component that captures the real-world objects in an environment of the user. In an exemplary embodiment, the input unit 305 may be lens. The optical unit 325 may be a component that allows the user to experience a mixed reality environment. In an exemplary embodiment, the optical unit 325 may be a headset. In some embodiments, the optical unit 325 and the input unit 305 may be a single unit. In such embodiments, the single unit is capable of operating as an independent unit that is in constant communication with other components of the mixed reality device 300. The memory unit 340 comprises a tailored advertisement delivery application 342 which is provided by the tailored advertisement delivery system 200. The tailored advertisement delivery application 342 may provide one or more instructions to the processing unit 310 which in turn causes the control unit 320 to control the input unit 305, the optical unit 325, and/or the output unit 330 to perform one or more steps as described herein. In an exemplary embodiment, the machine learning models 423 present in the tailored advertisement delivery application 342 may cause the input unit 305 to capture the real-time objects in the environment of the user 110 and identify the type of real-time objects. The memory 340 may further comprise one or more applications (e.g., virtual reality application, augmented reality applications, or the like) provided by the application management system 202. For example, the user 110 may experience mixed reality environment via the one or more applications provided by the application management system 202 and one or more components of the mixed reality device 330.

In some embodiments, based on the instructions and control signals received from the tailored advertisement delivery system 200 or the executable instructions present in the tailored advertisement delivery application 342, the processing unit 310 via the control unit 320 may cause the mixed reality device 300 to perform one or more actions described herein.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a tailored advertisement delivery application 421 comprising Machine Learning (ML) models 423, an SMS application, or the like. The memory 420 may further comprise one or more applications (e.g., virtual reality application, augmented reality applications, or the like) provided by the application management system 202. The memory 420 of the computing device system 400 may comprise a Short Message Service (SMS) application 424 configured to send, receive, and store data, information, communications, alerts, and the like via the wireless telephone network 152. In some embodiments, the tailored advertisement delivery application 421 provided by the tailored advertisement delivery system 200 causes the one or more components of the computing device system 400 to capture the real-time objects in the environment of the user 110 and identify the type of real-time objects.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a high level process flow 500 for delivering tailored advertisements in a mixed reality environment, in accordance with an embodiment of the invention. Mixed reality environment is a combination of virtual reality environment and augmented reality environment, where virtual elements (e.g., advertisements, gaming characters in one or more games, or the like) are placed around real-world objects that are in the environment of the user. The user may interact and modify the virtual elements displayed using one or more components of the mixed reality devices 300 or computing device systems 400. In some embodiments, the user may interact and modify the virtual elements using gestures, expressions, or the like. In such embodiments, the system of the present invention supports the user's interactions by transmitting one or more instructions to the mixed reality devices 300 and/or the computing device system 400.

As shown in block 505, the system continuously detects features in a mixed reality environment. In some embodiments, the tailored advertisement delivery application 342 and the tailored advertisement delivery application 421 provided by the tailored advertisement delivery system 200 cause the one or more components of the mixed reality devices 300 and the computing device system 400 to detect features in a mixed reality environment. For example, the tailored advertisement delivery application may cause a mixed reality headset to detect and capture the environment of the user 110. In some embodiments, the tailored advertisement delivery application 342 and the tailored advertisement delivery application 421 may comprise executable instructions that are stored in the memory of the mixed reality device 300 and the computing device systems 400.

As shown in block 510, the system identifies one or more objects in the mixed reality environment. In some embodiments, the tailored advertisement delivery application provided by the tailored advertisement delivery system 200 comprises machine learning models that are trained to identify real-world objects. The tailored advertisement delivery system 200 trains neural networks using several images and generates the machine learning models that can identify real-world objects, where the machine learning models are then transmitted and stored on the user device. In some embodiments, the machine learning models are trained to identify objects that are associated with products manufactured, distributed, and/or supplied by the third party entities (e.g., advertisers). For example, the system may identify that a third party entity manufactures facial tissues and is bidding on any tissue papers or any facial products and may train the neural networks over several images of tissue papers and facial products. After completion of the training, the tailored advertisement delivery system 200 develops machine learning models that can identify any facial products and tissue papers with a confidence score attached to each object.

In alternate embodiments, the tailored advertisement delivery application provided by the tailored advertisement delivery system 200 transmits the real-time data captured by the user device to the tailored advertisement delivery system 200, where the identification of the one or more objects that are captured by the one or more components of the user devices takes place in the tailored advertisement delivery system 200. The process of analyzing features and identifying objects is explained in more detail in FIG. 9.

As shown in block 515, the system identifies that the one or more objects match at least one of the advertising targets. The tailored advertisement delivery system 200 comprises the advertisement database 292 that comprises advertisement context provided by the one or more third party systems via the bidding application 260. For example, a soft drink manufacturing company may bid on a water bottle and upon when a water bottle is detected in the environment of the user in real-time, the system displays an advertisement for a soft drink manufactured by the soft drink company. As shown in block 520, the system generates a tailored advertisement and transmits the tailored advertisement to the user device of the user. The tailored advertisement delivery system 200 generates a tailored advertisement that can be displayed to the user without any interruptions and can possibly be converted into a "hit" (e.g., user clicking/interacting with an advertisement) and then transmits the tailored advertisement to the user device. The process of selecting and generating the tailored advertisement is dependent on multiple factors and is explained in greater detail in FIG. 10 and FIG. 11.

As shown in block 525, the system causes the user device to display the tailored advertisement. The tailored advertisement delivery system 200 causes the one or more components of the user device to display the tailored advertisements to the user, where the tailored advertisement blends into the environment of the user. In an exemplary embodiment, where the mixed reality environment is a virtual reality environment and the user is moving in the virtual world, the tailored advertisement delivery system 200 may display an advertisement comprising an offer related to a brand of car outside a virtual car showroom. The process of displaying the tailored advertisement in the environment of the user is explained in greater detail in FIG. 11.

As shown in block 530, the system determines that the user is interacting with the tailored advertisement in real-time. Continuing with the previous example, the tailored advertisement delivery system after displaying the advertisement to the user may continuously monitor actions of the user and may identify that the user has clicked on the offer. The process of determining that the user interacting with the tailored advertisement is explained in greater detail in FIG. 12.

As shown in block 535, the system collects and stores one or more metrics associated with the interaction. The tailored advertisement delivery system 200 based on continuously monitoring the actions of the users, collects one or more metrics associated with the interaction of the user with the tailored advertisement. The process of collecting and storing the one or more metrics is explained in greater detail in FIG. 13.

The process flow 500 described in FIG. 5 may vary based on whether the mixed reality environment is a virtual reality environment or an augmented reality environment. In an embodiment, where the mixed reality environment is a virtual reality environment, the process flow for delivering tailored advertisements is explained in FIG. 6. In an embodiment where the mixed reality environment is an augmented reality environment and where the augmented reality environment is experienced by the user using a front view camera of a user device (e.g., front facing camera of a mobile device), the process flow for delivering tailored advertisements is explained in FIG. 7. The process flow described in FIG. 7 is also applicable for any mixed reality devices (e.g., augmented reality mirrors or the like) that allow the user to view bodily features (e.g., face) and the environment around the user. In an embodiment where the mixed reality environment is an augmented reality environment and where the augmented reality environment is experienced by the user using a rear view camera of a user device (e.g., rear view camera of a mobile device), the process flow for delivering tailored advertisements is explained in FIG. 8. The process flow described in FIG. 8 is also applicable for other mixed reality devices such as augmented reality headsets, augmented reality lenses, or the like that allow the user to view the real-time environment via an optical unit.

FIG. 6 provides a flowchart illustrating a process flow 600 for delivering tailored advertisements in a virtual reality environment, in accordance with an embodiment of the invention. As shown in block 605, the system identifies that the user has entered a virtual reality environment of an application. The user may access the virtual reality environment via one or more applications provided by the application management systems 202. Virtual reality environment provided by each application may vary. For example, a virtual reality environment provided by a gaming application may vary from a virtual reality environment provided by an application that is designed to view an aquarium. The one or more applications may be stored on a user device (e.g., virtual reality glasses or a console linked with the virtual reality glasses) and the user may access the one or more applications by providing authentication details. The tailored advertisement delivery system 200 may track the one or more applications that are installed on the user device via the tailored advertisement delivery application to determine that the user has accessed a virtual reality application and entered the virtual environment provided by the application.

In some embodiments, the tailored advertisement delivery system 200 upon determining that the user has accessed the virtual reality application, may generate a unique identifier, where the unique identifier is used to track and store information associated with the user interactions with the virtual reality application.

As shown in block 610, the system identifies one or more virtual objects around the user in the virtual environment. For example, where the virtual reality application is an application that allows user to experience an aquarium, the tailored advertisement delivery system 200 may identify that the user is viewing a jelly fish tank. The tailored advertisement delivery system 200 identifies the one or more objects the user is viewing via the one or more components of the user device and the tailored advertisement delivery application stored on the user device. In some embodiments, the tailored advertisement delivery system 200 may have information (e.g., features provided by the virtual reality application, virtual objects and positions of the virtual objects within the virtual environment provided by the virtual reality application, or the like) associated with the one or more applications stored in the data repository, where this information is received from the application management system 202.

As shown in block 615, the system determines current location of the user based on the one or more objects in the virtual environment. Based on the information associated with the virtual reality application and the one or more objects identified in block 610, the tailored advertisement delivery system 200 tracks the position of the user within the virtual reality environment. In response to identifying the one or more objects and the current location of the user, the system may generate tailored advertisements associated with the one or more objects, virtual stores around the current location of the user, and the like. The process flow associated with generation of tailored advertisements in discussed in detail in FIG. 10 and FIG. 11. In some embodiments, the generated tailored advertisement may be a two dimensional (2D) advertisement. In some other embodiments, the generated tailored advertisement may be a three dimensional (3D) advertisement. In some embodiments, the generated tailored advertisement may be a video advertisement.

As shown in block 620, the system calculates positional coordinates to place an advertisement based on the current location of the user. The tailored advertisement delivery system 200 calculates the positional coordinates based on the type of tailored advertisement. For example, if the tailored advertisement is a 2D advertisement, the system determines one or more billboards around the current location of the user and calculates the positional coordinates to place the 2D ad. In another example, if the generated tailored advertisement is a 3D advertisement, the system determines a place on the ground around the user (e.g., preferably within a 0.01 mile radius of the user) where there are no virtual objects and calculates the positional coordinates of the place to display the three dimensional advertisement.

As shown in block 625, the system, in some embodiments, automatically places the advertisement in the positional coordinates. In some embodiments, the tailored advertisement delivery system 200 may have permissions to automatically place the tailored advertisement in the virtual reality environment and in such embodiments, the system automatically places the advertisement in the calculated positional coordinates. As shown in block 630, the system, in alternate embodiments, transmits the positional coordinates and the tailored advertisement to the application management system of the virtual reality application. The application management system upon receiving the positional coordinates places the tailored advertisement in the specified positional coordinates.

FIG. 7 provides a flowchart illustrating a process flow 700 for delivering tailored advertisements in an augmented reality environment when the user is using a front faced camera of an augmented reality device, in accordance with an embodiment of the invention.

As shown in block 705, the system determines that the user is using an augmented reality device. In some embodiments, the tailored advertisement delivery system 200 may receive an indication from the augmented reality device once the user accesses the augmented reality device. As shown in block 710, the system determines that the user is accessing an augmented reality application via the augmented reality device. The user may experience an augmented reality environment based on accessing one or more augmented reality applications provided by the application management system 202. The virtual elements provided by each augmented reality application may vary. For example, virtual elements provided by a gaming application may vary from virtual elements provided by a shopping application. The one or more augmented reality applications may be stored on a user device (e.g., computing device system, augmented reality glasses, or a console linked with the augmented reality glasses) and the user may access the one or more augmented reality applications by providing authentication details. The tailored advertisement delivery system 200 may track the one or more applications that are installed on the user device via the tailored advertisement delivery application to determine that the user has accessed an augmented reality application.

As shown in block 715, the system determines that the user is using a front facing camera of the augmented reality device to access features of the augmented reality application. In some embodiments, the front faced camera is typically used by augmented reality applications that are associated with providing shopping experience (e.g., to try out clothes, makeup, or the like) to the users. In some embodiments, the system may determine that the user is using the front facing camera based on gathering information from the one or more components of the user device. In other embodiments, the system may determine that the user is using the front facing camera based on determining that the user has accessed an augmented reality application that requires usage of the front facing camera of the user device.

As shown in block 720, the system identifies, via neural network models, one or more bodily features of the user. In some embodiments, the system, via neural network models, identifies only one or more facial features (e.g., eyes, nose, mouth, or the like) of the user. In some other embodiments, the system identifies all of the one or more bodily features (e.g., feet, hands, or the like) of the user. In response to determining that the user is using the front facing camera of the user device, the tailored advertisement delivery system 200 identifies the one or more bodily features of the user, via the ML models in the tailored advertisement delivery application present in the user device. In some other embodiments, the tailored advertisement delivery system 200 receives the real-time feed from the front faced camera of the user device, via the tailored advertisement delivery application and one or more components of the user device, and then identifies the one or more bodily features via the trained neural network models/machine learning models.

In some embodiments, identification of the one or more bodily features comprises the neural network models generating a mesh that overlaps with the one or more bodily features of the user. The mesh generated by the neural network models may be divided into one or more segments. The neural networks may determine a type of the bodily features based on the generated mesh. For example, the system may detect a feature and may generate a mesh that overlaps the detected feature. Based on the mesh, the neural network models may determine that the feature detected is nose of the user. In another example, the system may detect user's feet and may generate a mesh that overlaps the user's feet.

As shown in block 725, the system transmits an advertisement to an application management system associated with the augmented reality application, where the advertisement overlaps at least one of the one or more bodily features. The advertisement generated by the tailored advertisement delivery system 200 is based on the one or more bodily features identified in block 720. For example, the system identifies face of the user and presents advertisements associated with make-up to the user. In another example, the system identifies entire body and presents advertisements associated with clothing to the user. The advertisement is generated by the tailored advertisement delivery system 200 based on one or more factors (e.g., user preferences, historical data, user profile, or the like). The one or more factors that affect the generation of the tailored advertisement is explained in detail in FIG. 10 and FIG. 11. In some embodiments, the system transmits the advertisement to the application management system of the augmented reality application, where the application management system displays the advertisement to the user. In some embodiments, the system also transmits the coordinates of the one or more segments to place the advertisement, where the one or more segments are associated with the mesh that is generated by the neural network models. In alternate embodiments, as shown in block 730, the system automatically displays an advertisement, where the advertisement overlaps at least one of the one or more bodily features. The system may calculate coordinates of the one or more segments to place the advertisement and places the advertisement in the coordinates. For example, the system may determine that coordinates X, Y, and Z associated with one or more segments of the mesh associated with user's eyes are suitable to place a shade of an eye shadow such that the eye shadow shade overlaps with the one or more segments of the user's eyelids. In some embodiments, based on the coordinates, the system may automatically alter the generated advertisement such that the advertisement overlaps the one or more bodily features.

In some embodiments, the advertisement may be an interstitial advertisement, where the advertisement completely covers the environment of the user. In some such embodiments, calculation of the coordinates may not be required. For example, if a user is trying out clothes using the front facing camera of a mobile phone, where the user is viewing different outfits via the user interface of the mobile device, the system may completely transform the user interface to display the advertisement. In other embodiments, the advertisement is not an interstitial advertisement.

FIG. 8 provides a flowchart illustrating a process flow 800 for delivering tailored advertisements in an augmented reality environment when the user is using a rear faced camera of an augmented reality device, in accordance with an embodiment of the invention.

As shown in block 805, the system determines that the user is using an augmented reality device. In some embodiments, the tailored advertisement delivery system 200 may receive an indication from the augmented reality device once the user accesses the augmented reality device. As shown in block 810, the system determines that the user is accessing an augmented reality application via the augmented reality device.

As shown in block 815, the system determines that the user is using a rear facing camera of the augmented reality device to access features of the augmented reality application. In some embodiments, the augmented reality application may be an application specifically designed to utilize rear facing camera of the user device. In such an embodiment, the tailored advertisement delivery system 200 may identify that the user is using the rear facing camera based on identifying that the user has accessed the augmented reality application. In some embodiments, the tailored advertisement delivery system 200 may identify that the user is using the rear facing camera based on communicating with the one or more components of the user device.

As shown in block 820, the system continuously identifies, via neural network models, one or more objects in the environment of the user. In response to determining that the user is using the rear facing camera of the user device, the tailored advertisement delivery system 200 continuously captures the environment of the user and identifies the one or more objects in the environment of the user, via the ML models in the tailored advertisement delivery application present in the user device. In some other embodiments, the tailored advertisement delivery system 200 receives the real-time feed from the rear faced camera of the user device, via the tailored advertisement delivery application and one or more components of the user device, and then identifies the one or more objects via the trained neural network models/machine learning models.

As shown in block 825, the system determines the positional coordinates of the one or more objects relative to the camera of the user device. For example, if a water bottle is identified in the environment of the user, the system calculates the positional coordinates of the water bottle with respect to the camera. In some other embodiments, the system may determine the positional coordinates of the one or more objects relative to any component of the user device. In some embodiments, the tailored advertisement delivery system 200 may generate output bounding boxes for each object and use a pixel detection algorithm to calculate the distance from each object.

As shown in block 830, the system builds a spatial cloud of the environment of the user. The spatial cloud comprises information associated with the one or more objects (e.g., type of the object, or the like) and positional coordinates of the one or more objects. In some embodiments, the system may store information and positional coordinates associated with some objects of the one or more objects identified in the environment of the user, where those objects are associated with the objects that are associated with one or more advertisements stored in the database. For example, if the system identifies a water bottle, a laptop, a coffee mug, and a plant, the system may identify that the third party entities placed their bids on water bottle and on laptop and may store information associated with the water bottle and the laptop. In some embodiments, the system may store information associated with all objects identified in the environment of the user. Continuing with the previous example, the system may store information associated with water bottle, laptop, coffee mug, and plant.

As shown in block 835, the system calculates one or more positional coordinates to place an advertisement based on the spatial cloud. The calculation of the one or more positional coordinates may be based on the type of advertisement generated by the system. In an embodiment, where the generated advertisement is a 2D advertisement, the tailored advertisement delivery system 200 may identify plain surface to display the 2D advertisement. In such embodiments, where the generated advertisement is a 2D advertisement that is placed in a mixed reality environment which is a three dimensional environment, the system converts the 2D advertisement into frames that fits into the three dimensional mixed reality environment.

In another embodiment, where the generated advertisement is a 3D advertisement, the tailored advertisement delivery system 200 may place the 3D on the ground where there are no other objects. In some embodiments, the one or more positional coordinates are calculated such that the advertisement is within a predefined distance (e.g., 0.01 mile radius from the camera o the user devices) from the current location of the user. In some embodiments, the tailored advertisement delivery system 200 may calculate the one or more positional coordinates such that the advertisement is placed close to the object that triggered the generation of the advertisement. For example, the system may place an advertisement associated with a soft drink close to a water bottle, where the water bottle triggered the generation of the soft drink advertisement.

As shown in block 840, the system transmits the one or more positional coordinates to place the advertisement to an application management system associated with the augmented reality application. The application management system may then place the advertisement in any of the one or more positional coordinates provided by the tailored advertisement delivery system 200. In alternate embodiments, as shown in block 845, the system automatically displays the advertisement in the at least one of the one or more positional coordinates.

In some embodiments, the advertisement may be an interstitial advertisement, where the advertisement completely covers the environment of the user. In some such embodiments, calculation of the one or more positional coordinates may not be required. For example, if a user is playing a game using the rear facing camera of a mobile phone, where the user is viewing the game via the user interface of the mobile device, the system may completely transform the user interface to display the advertisement. In other embodiments, the advertisement is not an interstitial advertisement.

FIG. 9 provides a flowchart illustrating a process flow 900 for analyzing features in a mixed reality environment and identifying one or more objects in the mixed reality environment, in accordance with an embodiment of the invention.

As shown in block 905, the system continuously captures environment of the user. As explained above, the tailored advertisement delivery system 200 captures the environment of the user via the tailored advertisement delivery application and the one or more components of the user device (e.g., computing device system 400 or mixed reality device 300).

As shown in block 910, the system analyzes the environment of the user to identify one or more objects. As explained above, neural network models are trained using images and machine learning models are generated by the tailored advertisement delivery system 200, where the machine learning models identify the one or more objects with a confidence score associated with the identification. For example, the machine learning model may detect an object around the user and may identify that the object is a water bottle with 99% confidence score. In some embodiments, the tailored advertisement delivery system 200 may use traditional vision techniques for detecting and identifying the one or more objects. In some embodiments, the tailored advertisement delivery system 200 may use object detection networks like mobile-net for identifying the one or more objects.

As shown in block 915, the system determines type of the one or more objects. The type of the object may disclose information whether an object is an outdoor object, indoor object, or the like. For example, the system may identify sunglasses and may classify sunglasses as an outdoor object. The tailored advertisement delivery system 200 may train neural networks and generate machine learning models that identify whether the objects are indoor objects, outdoor objects, objects related to a specific location (e.g., gym, office, or the like), or the like.

As shown in block 920, the system determines a location of the user based on analyzing the one or more objects. The tailored advertisement delivery system 200 determines the location of the user based on identifying the type of the one or more objects. For example, the system may identify telephone, laptop, books, notepads, stapler, or the like in the environment of the user and may determine that the user is in an office. In another example, the system may identify treadmill, weights, training bench, or the like in the environment of the user and may determine that the user is in a gym. In another example, the system may identify knives, vegetables, pots, or the like in the environment of the user and the system may identify that the user is in a kitchen. In some embodiments, in addition to identifying the location of the user based on analyzing the one or more objects, the tailored advertisement delivery system 200 may also use at least one of global positioning system, Bluetooth, WLAN, to determine the location of the user.

In some embodiments, the tailored advertisement delivery system 200 determines time of the day based on analyzing the environment of the user. In some embodiments, the system may also identify a brand associated with the one or more object. For example, the system may identify a water bottle in the environment of the user and may determine the brand of the water bottle using Optical Character Recognition (OCR). In some embodiments, the tailored advertisement delivery system 200 may identify that at least one object appears more than a predetermined amount of times in the environment of the user and may store information associated with the at least one object in a profile of the user. In some embodiments, the tailored advertisement delivery system 200 may identify one or more patterns associated with the user, where the one or more patterns may be associated with activities of the user, location of the user, or the like. As shown in block 930, the system stores the rendered data in a profile of the user.

FIG. 10 provides a flowchart illustrating a process flow 1000 for determining a match between objects in the mixed reality environment of the user and one or more advertisements stored in an advertisement database, in accordance with an embodiment of the invention.

As shown in block 1005, the system identifies a first object in the environment of the user. As shown in block 1010, the system determines a match for the first object in an advertisement database. The system may determine a category associated with the first object and may determine one or more advertisements in the advertisement for the category associated with the first object. For example, the system may identify a water bottle in the environment of the user, may determine that water bottle is associated with consumable drinks, and may search the advertisement database to identify one or more advertisements associated with the category of consumable drinks and to determine a match for the water bottle. The match is associated with a bid placed by a third party entity that manufactures, distributes, and/or sells consumable drinks. In some cases, the bid placed by the third party entity may be a winning bid.

As shown in block 1015, the system determines that more than one advertisements exist in the advertisement database for the first object. Continuing with the previous example, the third party entity that placed a bid on the water bottle may have one or more advertisement contexts that are directed to different products targeted to different types of users. The third party entity may have one or more campaigns that target different types of users. In one exemplary embodiment, one campaign may be associated with users that are conscious about health. In another exemplary embodiment, one campaign may be associated with a younger age group.

As shown in block 1020, the system selects a first advertisement from the more than advertisements based on one or more factors. The one or more factors may include, but are not limited to, location of the user, time of the day, age group of the user, patterns associated with activities of the user, user preferences, or the like. In some embodiments, the information associated with the one or more factors may be stored in a profile of the user. Continuing with the previous example, the system may identify that the user falls under a 12-17 age group and may present an advertisement associated with an orange flavored soft drink to the user. In another case, the system may identify that the user is health conscious based on identifying that the user goes to a gym every day and may present an advertisement associated with zero calorie soft drink to the user. In another case, the system may identify that the user is in a playground and may present an advertisement of an energy drink to the user. In another case, the system may present an advertisement associated with a caffeinated drink to the user in the morning. In some embodiments, the tailored advertisement delivery system 200 may select the first advertisement based on any combination of the one or more factors mentioned above.

In some embodiments, the tailored advertisement delivery system 200 may display an advertisement associated with a third party entity that placed the highest bid upon identification of the object associated with the bid. In some embodiments, the tailored advertisement delivery system 200 may assign higher priority to the advertisements associated with a third party entity that placed the second highest bid based on the preferences of the user. In some embodiments, the system may recycle advertisements such that the advertisements that are displayed to the user are non-repetitive. For example, the system may identify a second object associated with the same category as that of the first object and the system may display any other advertisement other than the first advertisement based on the one or more factors.

FIG. 11 provides a flowchart illustrating a process flow 1100 for retrieving and displaying advertisements in the mixed reality environment of the user, in accordance with an embodiment of the invention.

As shown in block 1105, the system retrieves context associated with the first advertisement. In response to selecting the first advertisement from the more than one advertisements, the tailored advertisement delivery system 200 retrieves context associated with the first advertisement. Continuing with the previous example, the system may select an advertisement associated with zero calorie soft drink and may retrieve context associated with the zero calorie drink. Context may include, but is not limited to, tag lines, available advertisement formats (e.g., 2D, 3D, or the like), audio, video, images, or the like associated with the advertisement.

As shown in block 1110, the system generates visual content comprising the context associated with the first advertisement based on a set of factors. The set of factors may include, but are not limited to, type of mixed reality environment (e.g., augmented reality environment or virtual reality environment), type of application used to access the mixed reality environment (gaming augmented reality application, an aquarium virtual reality application, or the like), the spatial cloud, the one or more objects in the environment of the user, time available for displaying the advertisement, space available to display the advertisement, or the like. In some embodiments, the tailored advertisement delivery system 200 may use any combination of the set of factors to generate the visual content associated with the first advertisement. The generated visual content may comprise a 2D advertisement or a 3D advertisement. In the case where the generated advertisement is a 3D advertisement, the 3D advertisement may comprise at least one of a 3D animation, a 3D image, and/or a 3D video. In the case where the generated advertisement is a 2D advertisement, the 2D advertisement may comprise at least one of a 2D image and/or a 2D video.

In an exemplary embodiment, the system may determine that the type of application used by the user to access the mixed reality environment is a gaming application with animated characters and may generate 3D animated visual content comprising the context of the first advertisement. In another exemplary embodiment, the system may determine that the type of application used by the user to access the mixed reality environment is a virtual shopping application that allows users to visit a virtual shopping mall. In one case, the system may generate a visual 2D advertisement that fits a virtual bill board located within a predefined distance from the current location of the user. In another case, the system may generate a video advertisement that fits a virtual bill board located within a predefined distance from the current location of the user. In some embodiments, the system may determine that the length of the video advertisement exceeds the time available to display the advertisement and may instead display a visual 3D advertisement. The tailored advertisement delivery system 200 may determine the time available to display the advertisement based at least on user patterns, type of application, likes and dislikes of the user, or the like. In some embodiments, the system may determine that the space around the user is crowded and may generate a 3D advertisement that can be placed on the ground. The visual content generated by the tailored advertisement delivery system 200 is enhanced so that advertisement blends into the mixed reality environment of the user. In some embodiments, the tailored advertisement delivery system 200 may use Generative Adversarial Networks (GAN) to enhance the visual content. In some embodiments, the visual content generated by the system may be an interstitial advertisement, where the visual content completely transforms the environment of the user to display the context of the advertisement.

As shown in block 1115, the system compresses the visual content to generate a compressed package, where the compressed package further comprises positional coordinates to place the advertisement and interaction gestures to interact with the visual content. In some embodiments, where the mixed reality environment is an augmented reality environment, the interaction gestures comprise at least one of hand gestures, eye gestures, facial expressions, or the like. For example, the user may interact with the visual content by gazing at the advertisement for more than the predetermined amount of time. In some embodiments, where the mixed reality environment is a virtual reality environment, the user may interact with the visual content via a controller and one or more components of the virtual reality device.

As shown in block 1120, the system transmits the compressed package to the user device. As shown in block 1125, the system causes the user device to decompress the compressed package. As shown in block 1130, the system displays the visual content in the environment of the user. In some embodiments, the system transmits the compressed package to the application management system of the first application.

FIG. 12 provides a flowchart illustrating a process flow 1200 for determining interaction between the user and the advertisement presented in the mixed reality environment of the user, in accordance with an embodiment of the invention.

As shown in block 1205, the system in response to displaying the visual content, determine gaze of the user. The tailored advertisement delivery system 200 may continuously measure the gaze of the user in response to displaying the visual content. In some embodiments, the tailored advertisement delivery system 200 measures the gaze of the user via one or more components of the user device. In some embodiments, the tailored advertisement delivery system 200 may measure gaze of the user based on the device measuring the coordinates of the mixed reality device and comparing the coordinates to the orientation of the one or more objects in the mixed reality environment.

As shown in block 1210, the system detects one or more gestures of the user. In some embodiments, the tailored advertisement delivery system 200 continuously monitors gestures of the user via one or more components of the user device to detect any movement in response to displaying the visual content.

As shown in block 1215, the system identifies one or more expressions of the user. In some embodiments, the tailored advertisement delivery system 200 monitors expressions of the user via one or more components of the user device to detect any changes in response to displaying the visual content.

In some embodiments, depending on the type of the mixed reality environment and the type of the user device used to access the mixed reality environment, the tailored advertisement delivery system 200 may perform the steps described in block 1205, 1210, and 1215. For example, if the mixed reality environment is a virtual reality environment, the tailored advertisement delivery system 200 may determine the gaze of the user and the one or more gestures of the user within the virtual environment. In such embodiments, the tailored advertisement delivery system 200 may continuously track the movements of the user in the virtual reality environment and/or tracking the operation of a control unit associated with the virtual reality device to determine the gaze and the one or more gestures of the user. In another example, if the mixed reality environment is an augmented reality environment and the user is experiencing augmented reality via a front facing camera of the user device, the tailored advertisement delivery system 200 monitors and determines the gaze, the one or more gestures, and the one or more expressions of the user. In yet another example, if the mixed reality environment is an augmented reality environment and the user is experiencing augmented reality via a rear facing camera of the user device, the tailored advertisement delivery system 200 monitors and determines the gaze and the one or more gestures of the user.

As shown in block 1220, the system determines that the user is interacting with the visual content based on matching at least one of the (i) the gaze of the user, (ii) the one or more gestures of the user, and (iii) the one or more expressions of the user with the interaction gestures. For example, the system may identify that the user has used swipe motion to access the visual content and may determine that the user is interacting with the visual content. In some embodiments, the system determines that the user is interacting with the visual content based on one or more audio inputs received from the user.

As shown in block 1225, the system presents additional visual content based on the interaction of the user. For example, the system may identify that the user is interacting with the 3D visual content and may present a website link to the user. The user may click on the website link to view additional information associated with the visual content.

FIG. 13 provides a flowchart illustrating a process flow 1300 for collecting and storing interaction metrics associated with the interaction of the user with the advertisement, in accordance with an embodiment of the invention.

As shown in block 1305, the system continuously tracks gaze of the user. The system tracks the gaze of the user via one or more components of the user device. For example, the system may identify that the gazing at a portion of a 2D advertisement based on continuously tracking the gaze of the user.

As shown in block 1310, the system generates a heat map based on continuously tracking the gaze of the user. The system in response to continuously tracking the gaze of the user, generates a heat map based on identifying that the user is gazing at a certain feature of the advertisement displayed to the user. For example, the system may identify that the user is gazing at an animated feature of the ad and may draw a heat map around the animated feature. Using this information, the tailored advertisement delivery system 200 may determine that the user is responding to animated visual effects and may store this information in a profile of the user. In another example, the system may identify that the user is gazing at mint flavor among one or more flavors of soft drinks provided in an advertisement and may draw a heat map around the mint flavored soft drink. Heat maps may allow the tailored advertisement delivery system 200 to identify what features the user is responding to. In some embodiments, heat maps may allow the tailored advertisement delivery system 200 to determine whether the user likes or dislikes a product presented in the advertisement. The system may store such information in the profile of the user and may use this information while generating future tailored advertisements to display to the user.

In an embodiment, where the user is experiencing virtual reality, the process flow associated with collecting and storing metrics ends at block 1310. In an embodiment where the user is experiencing augmented reality using a rear facing camera of the computing device system 400, the process flow associated with collecting and storing metrics ends at block 1310. In other embodiments where the user is experiencing augmented reality using front facing camera of the computing device system 400 or any mixed reality devices 300, the process flow associated with collecting and storing metrics continues to block 1315 and ends at block 1325.

As shown in block 1315, the system continuously tracks expressions of the user. The system tracks the expressions of the user via one or more components of the user device. As shown in block 1320, the system determine emotions associated with the expressions of the user. Neural networks are trained by the tailored advertisement delivery system 200 to develop machine learning models that identify expressions of the user with a confidence score. The neural networks are trained by the tailored advertisement delivery system 200 using one or more visual images. In some embodiments, in response to determining that the user is interacting with the visual content, the tailored advertisement delivery system 200 may analyze the expressions of the user via the one or more components of the user device and the tailored advertisement delivery application present in the user device. In some embodiments, the tailored advertisement delivery application present in the user device may transmit live feed to the tailored advertisement delivery system 200 and the machine learning models present in the tailored advertisement delivery system 200 identify the one or more expressions of the user. For example, based on the expressions of the user, the system may identify that the user is not happy after viewing visual content (e.g., shade of lipstick, piece of clothing, a flavor of a soft drink, a gaming character, or the like) presented to the user with 98% confidence score.

As shown in block 1325, the system stores the heat map and emotions in the profile of the user. The system may use the heat map and the emotions in the profile of the user while generating visual content for future advertisements. As shown in block 1330, the system anonymizes the heat map and emotions of the user and transmits the heat map and emotions of the user to third party entities. The system may anonymize the data and may provide the information via a dashboard (e.g., user interface of the bidding application 260) to the third party entities. For example, the system may share that a group of users presented a strong liking towards a particular flavor of soft drink. This anonymized information may be utilized by the tailored advertisement delivery system 200 to charge the third party entities.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for determining user interactions with visual content presented in a mixed reality environment, the system comprising:
   at least one network communication interface;
   at least one non-transitory storage device; and
   at least one processing device coupled to the at least one non-transitory storage device and the at least one network communication interface, wherein the at least one processing device is configured to:
   generate visual content comprising context associated with an advertisement, wherein the visual content is application specific visual content generated based on an identified type of an application used by a user to access a mixed reality environment, wherein the application specific visual content matches an environment of the application used by the user to access the mixed reality environment;
   display the visual content associated with the advertisement in the mixed reality environment of the user, via a user device of the user;
   in response to displaying the visual content, perform at least one of one or more actions of:
      continuously monitoring gaze of the user via the user device;
      continuously monitoring one or more gestures of the user, via the user device; and
      continuously monitoring one or more expressions of the user, via the user device;
   determine that the user is interacting with the visual content based on at least one of the gaze, the one or more gestures, and the one or more expressions of the user;
   generate additional visual content in response to determining that the user is interacting with the visual content, wherein the additional visual content is associated with the visual content and the advertisement; and
   display the additional visual content in the mixed reality environment of the user, via the user device of the user.

2. The system of claim 1, wherein the at least one processing device is configured to perform at least one of the one or more actions based on:
   determining type of the mixed reality environment of the user; and
   determining type of the visual content.

3. The system of claim 2, wherein the type of visual content is at least a two dimensional advertisement or a three dimensional advertisement, wherein the two dimensional advertisement comprises a two dimensional image or a two dimensional video, wherein the three dimensional advertisement comprises at least one of a three dimensional animation, a three dimensional image, a three dimensional video.

4. The system of claim 2, wherein the type of the mixed reality environment is a virtual reality environment.

5. The system of claim 2, wherein the type of the mixed reality environment is an augmented reality environment.

6. The system of claim 1, wherein the at least one processing device is configured to determine that the user is interacting with the visual content based on matching the at least one of the gaze, the one or more gestures, and the one or more expressions of the user with one or more interactions gestures associated with the visual content.

7. A computer program product for determining user interactions with visual content presented in a mixed reality environment, the computer program product comprising a non-transitory computer-readable storage medium having computer executable instructions for causing a computer processor to perform the steps of:

generating visual content comprising context associated with an advertisement, wherein the visual content is application specific visual content generated based on an identified type of an application used by a user to access a mixed reality environment, wherein the application specific visual content matches an environment of the application used by the user to access the mixed reality environment;

displaying the visual content associated with the advertisement in the mixed reality environment of the user, via a user device of the user;

in response to displaying the visual content, performing at least one of one or more actions of:
continuously monitoring gaze of the user via the user device;
continuously monitoring one or more gestures of the user, via the user device; and
continuously monitoring one or more expressions of the user, via the user device;

determining that the user is interacting with the visual content based on at least one of the gaze, the one or more gestures, and the one or more expressions of the user;

generating additional visual content in response to determining that the user is interacting with the visual content, wherein the additional visual content is associated with the visual content and the advertisement; and displaying the additional visual content in the mixed reality environment of the user, via the user device of the user.

8. The computer program product of claim 7, wherein the computer executable instructions for performing at least one of the one or more actions comprise:
determining type of the mixed reality environment of the user; and
determining type of the visual content.

9. The computer program product of claim 8, wherein the visual content is at least a two dimensional advertisement or a three dimensional advertisement, wherein the two dimensional advertisement comprises a two dimensional image or a two dimensional video, wherein the three dimensional advertisement comprises at least one of a three dimensional animation, a three dimensional image, a three dimensional video.

10. The computer program product of claim 8, wherein type of the mixed reality environment is a virtual reality environment.

11. The computer program product of claim 8, wherein the mixed reality environment is an augmented reality environment.

12. The computer program product of claim 7, wherein the computer executable instructions cause the computer process to perform the step of determining that the user is interacting with the visual content based on matching the at least one of the gaze, the one or more gestures, and the one or more expressions of the user with one or more interactions gestures associated with the visual content.

13. A computer implemented method for determining user interactions with visual content presented in a mixed reality environment, wherein the method comprises:

generating visual content comprising context associated with an advertisement, wherein the visual content is application specific visual content generated based on an identified type of an application used by a user to access a mixed reality environment, wherein the application specific visual content matches an environment of the application used by the user to access the mixed reality environment;

displaying the visual content associated with the advertisement in the mixed reality environment of the user, via a user device of the user;

in response to displaying the visual content, performing at least one of one or more actions of:
continuously monitoring gaze of the user via the user device;
continuously monitoring one or more gestures of the user, via the user device; and
continuously monitoring one or more expressions of the user, via the user device;

determining that the user is interacting with the visual content based on at least one of the gaze, the one or more gestures, and the one or more expressions of the user;

generating additional visual content in response to determining that the user is interacting with the visual content, wherein the additional visual content is associated with the visual content and the advertisement; and displaying the additional visual content in the mixed reality environment of the user, via the user device of the user.

14. The computer implemented method of claim 13, wherein performing at least one of the one or more actions comprises:
determining type of the mixed reality environment of the user; and
determining type of the visual content.

15. The computer implemented method of claim 14, wherein the type of the mixed reality environment is a virtual reality environment.

16. The computer implemented method of claim 14, wherein the type of the mixed reality environment is an augmented reality environment.

17. The computer implemented method of claim 13, wherein determining that the user is interacting with the visual content is based on matching the at least one of the gaze, the one or more gestures, and the one or more expressions of the user with one or more interactions gestures associated with the visual content.

* * * * *